US012561871B2

(12) United States Patent

Gubbi Lakshminarasimha et al.

(10) Patent No.: US 12,561,871 B2

(45) Date of Patent: Feb. 24, 2026

(54) SYSTEMS AND METHODS FOR RECONSTRUCTING IMAGES USING UNCERTAINTY LOSS

(71) Applicant: Tata Consultancy Services Limited, Mumbai (IN)

(72) Inventors: Jayavardhana Rama Gubbi Lakshminarasimha, Bangalore (IN); Pavan Kumar Reddy Kancham, Bangalore (IN); Mohana Singh, Bangalore (IN); Arpan Pal, Kolkata (IN); Viswanath Pamulakanty Sudarshan, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 290 days.

(21) Appl. No.: 18/460,949

(22) Filed: Sep. 5, 2023

(65) Prior Publication Data

US 2024/0104798 A1 Mar. 28, 2024

(30) Foreign Application Priority Data

Sep. 16, 2022 (IN) ............................. 202221053022

(51) Int. Cl.
| | |
|---|---|
| *G06V 10/74* | (2022.01) |
| *G06T 7/00* | (2017.01) |
| *G06T 11/00* | (2006.01) |

(52) U.S. Cl.
CPC .......... *G06T 11/005* (2013.01); *G06T 7/0012* (2013.01); *G06V 10/761* (2022.01);
(Continued)

(58) Field of Classification Search
CPC ................. G06T 11/005; G06T 11/006; G06T 2207/10088; G06T 2207/20081;
(Continued)

(56) References Cited

U.S. PATENT DOCUMENTS

| | | | | |
|---|---|---|---|---|
| 12,315,045 | B2 * | 5/2025 | Preuhs | .................. G06T 11/005 |
| 2020/0349729 | A1 * | 11/2020 | Wu | ...................... H04N 13/122 |

(Continued)

OTHER PUBLICATIONS

Liu et al., "Robust Framework for PET Image Reconstruction Incorporating Systema and Measurement Uncertainties," PLoS One 7(3): e32224 (2012).

(Continued)

*Primary Examiner* — Tsung Yin Tsai

(74) *Attorney, Agent, or Firm* — Finnegan, Henderson, Farabow, Garrett & Dunner, LLP

(57) ABSTRACT

Model-based image reconstruction (MBIR) methods using convolutional neural networks (CNNs) as priors have demonstrated superior image quality and robustness compared to conventional methods. Studies have explored MBIR combined with supervised and unsupervised denoising techniques for image reconstruction in magnetic resonance imaging (MRI) and positron emission tomography (PET). Unsupervised methods like the deep image prior (DIP) have shown promising results and are less prone to hallucinations. However, since the noisy image is used as a reference, strategies to prevent overfitting are unclear. Recently, Bayesian DIP (BDIP) networks that model uncertainty tend to prevent overfitting without requiring early stopping. However, BDIP has not been studied with data-fidelity term for image reconstruction. Present disclosure provides systems and method that implement a MBIR framework with a modified BDIP. Specifically, an uncertainty-based penalty is included to the BDIP to improve reconstruction across iterations.

18 Claims, 6 Drawing Sheets

(52) U.S. Cl.
CPC ............... *G06T 2207/10088* (2013.01); *G06T 2207/20081* (2013.01); *G06T 2207/20084* (2013.01)

(58) Field of Classification Search
CPC ..... G06T 2207/20084; G06T 2211/424; G06T 2211/441; G06T 2211/464; G06T 7/0012; G06V 10/761

See application file for complete search history.

(56) References Cited

U.S. PATENT DOCUMENTS

| | | | |
|---|---|---|---|
| 2022/0392122 A1* | 12/2022 | Preuhs ............... | G01R 33/5608 |
| 2024/0029283 A1* | 1/2024 | Liu ........................... | G06T 7/55 |
| 2024/0062337 A1* | 2/2024 | Chen ................. | G01R 33/1276 |

OTHER PUBLICATIONS

Wang et al., "Global-Local attention network with multi-task uncertainty loss for abnormal lymph node detection in MR images," Medical Image Analysis, 77 (2022).

* cited by examiner

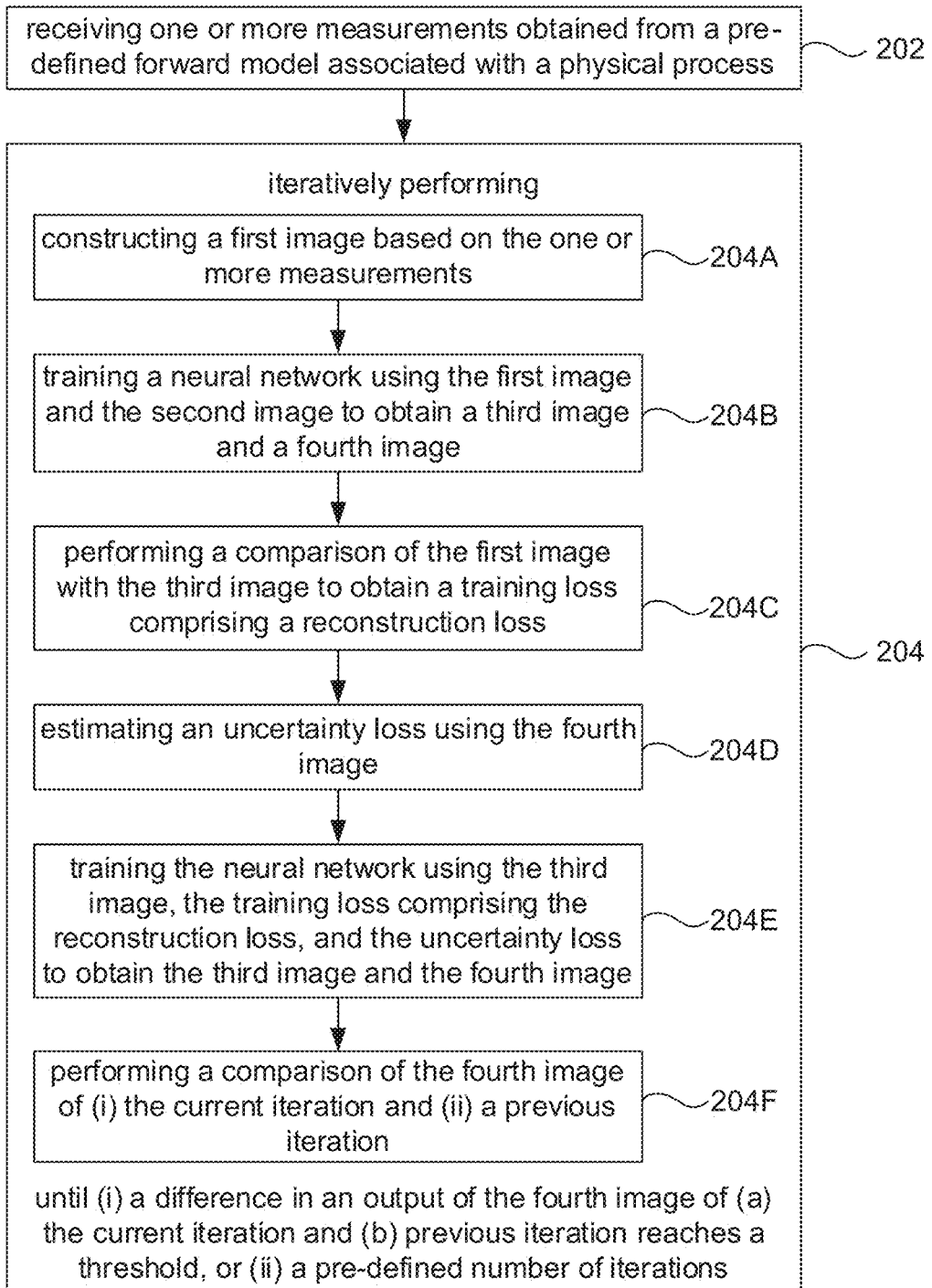

receiving one or more measurements obtained from a pre-defined forward model associated with a physical process ⟋ 202 iteratively performing constructing a first image based on the one or more measurements ⟋204A training a neural network using the first image and the second image to obtain a third image and a fourth image ⟋204B performing a comparison of the first image with the third image to obtain a training loss comprising a reconstruction loss ⟋204C

⟋ 204 estimating an uncertainty loss using the fourth image ⟋204D training the neural network using the third image, the training loss comprising the reconstruction loss, and the uncertainty loss to obtain the third image and the fourth image ⟋204E performing a comparison of the fourth image of (i) the current iteration and (ii) a previous iteration ⟋204F until (i) a difference in an output of the fourth image of (a) the current iteration and (b) previous iteration reaches a threshold, or (ii) a pre-defined number of iterations

FIG. 3

SYSTEMS AND METHODS FOR RECONSTRUCTING IMAGES USING UNCERTAINTY LOSS

PRIORITY CLAIM

This U.S. patent application claims priority under 35 U.S.C. § 119 to: Indian Patent Application No. 202221053022, filed on Sep. 16, 2022. The entire contents of the aforementioned application are incorporated herein by reference.

TECHNICAL FIELD

The disclosure herein generally relates to image reconstruction, and, more particularly, to systems and methods for reconstructing images using uncertainty loss.

BACKGROUND

Model based image reconstruction (MBIR) methods using deep neural networks (DNN) as priors have demonstrated superior image quality and robustness compared to DNNs that reconstruct images from either image domain or measurement domain. Recently, MBIR in combination with both supervised and unsupervised denoising techniques have become popular for image reconstruction in various applications (e.g., magnetic resonance imaging (MRI), positron emission tomography (PET), and the like). While supervised DNNs are prone to hallucinating artifacts on unseen data arising from newer acquisition scenarios, unsupervised denoisers like the deep image prior (DIP) have demonstrated the ability to match the performance of supervised methods. However, since the noisy image is used as the reference image, strategies to prevent overfitting are unclear.

SUMMARY

Embodiments of the present disclosure present technological improvements as solutions to one or more of the above-mentioned technical problems recognized by the inventors in conventional systems.

For example, in one aspect, there is provided a processor implemented method for reconstructing images using uncertainty loss. The method comprises receiving, via one or more hardware processors, one or more measurements obtained from a pre-defined forward model associated with a physical process; iteratively performing: constructing, via the one or more hardware processors, a first image based on the one or more measurements; training, a neural network via the one or more hardware processors, using the first image and a second image to obtain a third image and a fourth image; performing a comparison of the first image with the third image to obtain a training loss comprising a reconstruction loss; estimating an uncertainty loss using the fourth image; training the neural network using the third image, the training loss comprising the reconstruction loss, and the uncertainty loss to obtain the third image and the fourth image; and performing a comparison of the fourth image of (i) the current iteration and (ii) a previous iteration, until (i) a difference in an output of the fourth image of (a) the current iteration and (b) a previous iteration reaches a threshold, or (ii) a pre-defined number of iterations.

In an embodiment, the first image serves as an input to a loss function for training the neural network.

In an embodiment, the second image serves as an input to a first layer of the neural network.

In an embodiment, the method further comprises training one or more weights of the neural network using the training loss.

In an embodiment, a weighted loss function is computed based on the first image, the third image and the fourth image.

In an embodiment, the third image and the fourth image are predicted at a final layer of the neural network.

In another aspect, there is provided a processor implemented system for reconstructing images using uncertainty loss. The system comprises: a memory storing instructions; one or more communication interfaces; and one or more hardware processors coupled to the memory via the one or more communication interfaces, wherein the one or more hardware processors are configured by the instructions to receive one or more measurements obtained from a pre-defined forward model associated with a physical process; iteratively perform: constructing a first image based on the one or more measurements; training a neural network using the first image and a second image to obtain a third image and a fourth image; performing a comparison of the first image with the third image to obtain a training loss comprising a reconstruction loss; estimating an uncertainty loss using the fourth image; training the neural network using the third image, the training loss comprising the reconstruction loss, and the uncertainty loss to obtain the third image and the fourth image; and performing a comparison of the fourth image of (i) the current iteration and (ii) a previous iteration, until (i) a difference in an output of the fourth image of (a) the current iteration and (b) a previous iteration reaches a threshold, or (ii) a pre-defined number of iterations.

In an embodiment, the first image serves as an input to a loss function for training the neural network.

In an embodiment, the second image serves as an input to a first layer of the neural network.

In an embodiment, the one or more hardware processors are further configured by the instructions to train one or more weights of the neural network using the training loss.

In an embodiment, a weighted loss function is computed based on the first image, the third image and the fourth image.

In an embodiment, the third image and the fourth image are predicted at a final layer of the neural network.

In yet another aspect, there are provided one or more non-transitory machine-readable information storage mediums comprising one or more instructions which when executed by one or more hardware processors cause reconstructing images using uncertainty loss by receiving one or more measurements obtained from a pre-defined forward model associated with a physical process; iteratively performing: constructing a first image based on the one or more measurements; training, a neural network, using the first image and a second image to obtain a third image and a fourth image; performing a comparison of the first image with the third image to obtain a training loss comprising a reconstruction loss; estimating an uncertainty loss using the fourth image; training the neural network, using the third image, the training loss comprising the reconstruction loss, and the uncertainty loss to obtain the third image and the fourth image; and performing a comparison of the fourth image of (i) the current iteration and (ii) a previous iteration, until (i) a difference in an output of the fourth image of (a) the current iteration and (b) a previous iteration reaches a threshold, or (ii) a pre-defined number of iterations.

In an embodiment, the first image serves as an input to a loss function for training the neural network.

In an embodiment, the second image serves as an input to a first layer of the neural network.

In an embodiment, the one or more instructions which when executed by the one or more hardware processors further cause training one or more weights of the neural network using the training loss.

In an embodiment, a weighted loss function is computed based on the first image, the third image and the fourth image.

In an embodiment, the third image and the fourth image are predicted at a final layer of the neural network.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 depicts an exemplary flow chart illustrating a method for reconstructing images using uncertainty loss, using the systems of FIG. 1-2, in accordance with an embodiment of the present disclosure

DETAILED DESCRIPTION

Figure 1:
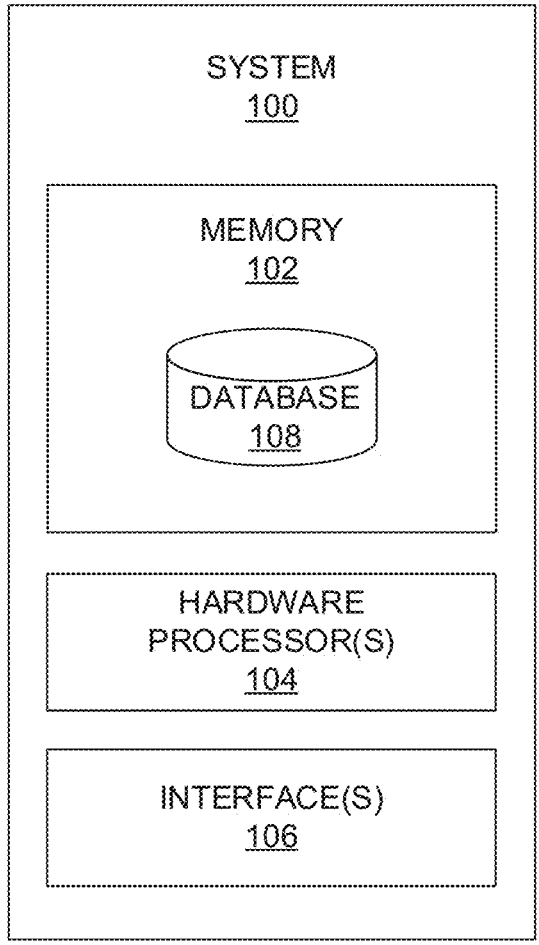
FIG. 1 depicts an exemplary system for reconstructing images using uncertainty loss, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Positron emission tomography (PET) is a molecular imaging technique that maps the uptake of an injected radiotracer. Clinicians infer functional and metabolic information from the spatial distribution of the radiotracers, e.g., fluorodeoxyglucose (FDG). Despite high specificity, PET suffers from challenges such as poor spatial resolution (detector geometry) and low signal-to-noise ratio (limited number of photons). Thus, typically, PET image reconstruction is guided by structural information from an anatomical modality such as magnetic resonance imaging (MRI). This work focuses on PET image reconstruction aided by structural information from corresponding co-registered MRI image.

After the seminal work that proposed the maximum-likelihood-based expectation maximization (MLEM) algorithm for PET image reconstruction (e.g., refer "Shepp, L., Vardi, Y.: Maximum likelihood reconstruction for emission tomography. IEEE Trans Med Imag. 1, 113 (1982)"), subsequent works exploited image gradient-based priors within the EM framework (e.g., refer "Green, P: Bayesian reconstructions from emission tomography data using a modified EM algorithm. IEEE Trans Med Imag. 9, 84 (1990)"), and later works included anatomical information from MRI (e.g., refer "Leahy, R., Yan, X: Incorporation of anatomical MR data for improved functional imaging with PET. In: Info Proc Med Imag. p. 105 (1991)", "Bowsher, J., Johnson, V., Turkington, T., Jaszczak, R., Floyd, C., Coleman, R: Bayesian reconstruction and use of anatomical a priori information for emission tomography. IEEE Trans Med Imag. 15, 673 (1996)", and "Nuyts, J., Fessler, J: A penalized-likelihood image reconstruction method for emission tomography, compared to post-smoothed maximum-likelihood with matched spatial resolution. IEEE Trans Med Imag. 22, 1042 (2003)"). With the advent of multimodal imaging systems, works focused on segmentation-free approaches that modeled joint priors enforcing similarities of (i) image gradients and their orientations across MRI and PET images at local neighborhoods (e.g., refer "Ehrhardt, M., Markiewicz, P., Liljeroth, M., Barnes, A., Kolehmainen, V., Duncan, J., Pizarro, L., Atkinson, D., Hutton, B., Ourselin, S., Thielemans, K., Arridge, S.: PET reconstruction with an anatomical MRI prior using parallel level sets. IEEE Trans Med Imag 35, 2189 (2016), "Ehrhardt, M., Thielemans, K., Pizarro, L., Atkinson, D., Ourselin, S., Hutton, B., Brian, F., Arridge, S.: Joint reconstruction of PET-MRI by exploiting structural similarity. Inverse Problems 31, 015001 (2014)", and "Knoll, F., Holler, M., Koesters, T., Otazo, R., Bredies, K., Sodickson, D.: Joint MR-PET reconstruction using a multi-channel image regularizer. IEEE Trans Med Imag. 36, 1 (2017)") or (ii) at a patch-level (e.g., refer "Tang, J., Wang, Y., Yao, R., Ying, L.: Sparsity-based PET image reconstruction using MRI learned dictionaries. In: IEEE Int Symp Biomed. Imag. p. 1087 (2014)", and "Sudarshan, V., Chen, Z., Awate, S.: Joint PET+MRI patch-based dictionary for Bayesian random field PET reconstruction. In: MICCAI. p. 338 (2018)"). The work in Vunckx et al. (e.g., refer "Vunckx, K., Nuyts, J.: Heuristic modification of an anatomical markov prior improves its performance. In: IEEE Nucl Sci Symp Med Imag Conf. pp. 3262{3266. IEEE (2010)") proposed an asymmetrical version of the Bowsher prior (e.g., refer "Bowsher, J., Johnson, V., Turkington, T., Jaszczak, R., Floyd, C., Coleman, R.: Bayesian reconstruction and use of anatomical a priori information for emission tomography. IEEE Trans Med Imag. 15, 673 (1996)"), demonstrating improved partial volume correction for PET images. Recent PET image enhancement approaches include denoising in the image domain using a learned convolutional neural network (CNN) (e.g., refer "Cui, J., Gong, K., Guo, N., Wu, C., Meng, X., Kim, K., Zheng, K., Wu, Z., Fu, L., Xu, B., et al.: PET image denoising using unsupervised deep learning. Eur J Nucl Med Mol Imag. 46, 2780 (2019)"). The work in Sudharshan et al. (e.g., refer "Sudarshan, V., Upadhyay, U., Egan, G., Chen, Z., Awate, S.: Towards lower-dose pet using physics-based uncertainty-aware multimodal learning with robustness to out-of-distribution data. Med Image Anal. 73, 102187 (2021)") used an uncertainty-aware loss function to train a CNN to predict standard-dose PET from low-dose PET. However, their work focused on mapping a given low-dose PET image to a standard-dose PET image using a training set (supervised method). Alternatively, the PET data is denoised in the sinogram domain and subsequently reconstructed using MLEM or other variants (e.g., refer "Sanaat, A., Arabi, H., Mainta, I., Garibotto, V., Zaidi, H.: Projection-space implementation of deep learning-guided low-dose brain PET imaging improves performance over implementation in image-space. J Nucl Med. p. 119 (2020)"). More recently, for PET reconstruction, work in Gong et al. (e.g., refer "Gong, K., Catana, C., Qi, J., Li, Q.: Pet image reconstruction using deep image prior. IEEE Trans Med Imag. 38(7), 1655{1665 (2018)") employed a Plug-and-Play (PnP) approach (e.g., refer "Sreehari, S., Venkatakrishnan, S., Wohlberg, B., Buzzard, G., Drummy, L., Simmons, J., Bouman, C.: Plug-and-play priors for bright field electron tomography and sparse interpolation. IEEE Trans Comput Imag 2(4), 408{423 (2016)", and "Chan, S., Wang, X., Elgendy, O.: Plug-and-play admm for image restoration: Fixed-point convergence and applications. IEEE Trans Comput Imag. 3(1), 84{98 (2016)") which uses the alternating direction method of multipliers (ADMM) based optimization scheme to alternate between the data-fidelity term and the image-denoising term.

The PnP framework for image reconstruction poses a constrained optimization problem (e.g., refer "Chan et al. as mentioned above", "Ahmad, R., Bouman, C., Buzzard, G., Chan, S., Liu, S., Reehorst, E., Schniter, P.: Plug-and-play methods for magnetic resonance imaging: Using denoisers for image recovery. IEEE Sig Proc Mag. 37(1), 105{116 (2020)", and "Gong et al.") that decouples the data-fidelity term and the image denoiser term. This enables the use of well-known denoisers as regularizers/priors coupled with a suitable data-fidelity term for image enhancement. For example, Gong et al. used a CNN that is based on the deep image prior (DIP) (e.g., refer "Ulyanov, D., Vedaldi, A., Lempitsky, V.: Deep image prior. In: IEEE Conf Comp Vis Patt Recog. pp. 9446{9454 (2018)") as the regularizer for PET reconstruction. While DIP has the advantage of not requiring training data, it easily overfits to the noisy reference image and hence, strategies to prevent overfitting are not clear. The work in Tolle et al. (e.g., refer "Tolle, M., Laves, M., Schlaefer, A.: A mean-field variational inference approach to deep image prior for inverse problems in medical imaging. In: Med Imag Deep Learning. pp. 745{760. PMLR (2021)") proposed a Bayesian DIP (BDIP) extending the work by Kendall et al. (e.g., refer "Kendall, A., Gal, Y.: What uncertainties do we need in Bayesian deep learning for computer vision? In: Adv Neural Info Proc Syst. p. 5574 (2017)"), for image denoising. Importantly, BDIP showed that early stopping was not necessary and that the predicted images showed non-decreasing peak signal-to-noise ratio (PSNR) with respect to the noiseless image, across epochs. However, BDIP does not focus on a data-fidelity term that is critical for severely ill-posed problems such as low-dose (or noisy) PET image reconstruction. On the other hand, the PnP framework do not focus on quantifying uncertainty and utilizing the uncertainty information for improving image quality across iterations. Currently several deep-learning based methods exist to reconstruct the signal from measurements. However, due to the black box nature of DNNs the reliability of the output becomes questionable and hence leads to using classical techniques which are reliable but at the cost of quality of output.

Present disclosure implements system and method that use uncertainty maps within the iterative reconstruction scheme. The system and method also implement the uncertainty maps generated at various stages of pipeline and carry forward the information till the analysis stage. The present disclosure work addresses the said issues by implementing a modified BDIP within the PnP framework for PET image reconstruction. More specifically, in the present disclosure, a modified version of the BDIP is implemented, that includes an uncertainty-weighted loss, which in turn is used as the unsupervised CNN-based regularizer within the PnP framework for image reconstruction. An uncertainty-weighted loss term is introduced by system and method of the present disclosure to train the BDIP so that the regions with higher uncertainty are penalized more compared to regions with lower uncertainty. The BDIP as implemented by the system of the present disclosure predicts at each iteration (i) denoised PET image (also referred as predicted PET image) and (ii) per-voxel predictive uncertainty through estimation of aleatoric and epistemic uncertainty. At each iteration, a risk map is generated using the two uncertainty components that indicates regions with high uncertainty values and use the same in subsequent iterations (via the uncertainty-weighted loss) to improve the reconstruction quality. Empirical results on simulated and in vivo data show that the method of the present disclosure provides improved PET quantification in addition to risk maps for improved risk management.

Referring now to the drawings, and more particularly to FIGS. 1 through 8, where similar reference characters denote corresponding features consistently throughout the figures, there are shown preferred embodiments and these embodiments are described in the context of the following exemplary system and/or method.

FIG. 1 depicts an exemplary system 100 for reconstructing images using uncertainty loss, in accordance with an embodiment of the present disclosure. In an embodiment, the system 100 may also be referred as 'reconstruction system' or 'image reconstruction system' and interchangeably used herein. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises one or more measurements obtained from a pre-defined forward model associated with a physical process. The database 108 further comprises training loss, uncertainty loss, various images constructed by the system, various images serving as input to the system, one or more various predicted and variance images outputted by one or more models comprised in the system, one or more inputs obtained from one or more users (e.g., domain experts) in the form of feedback, and the like. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
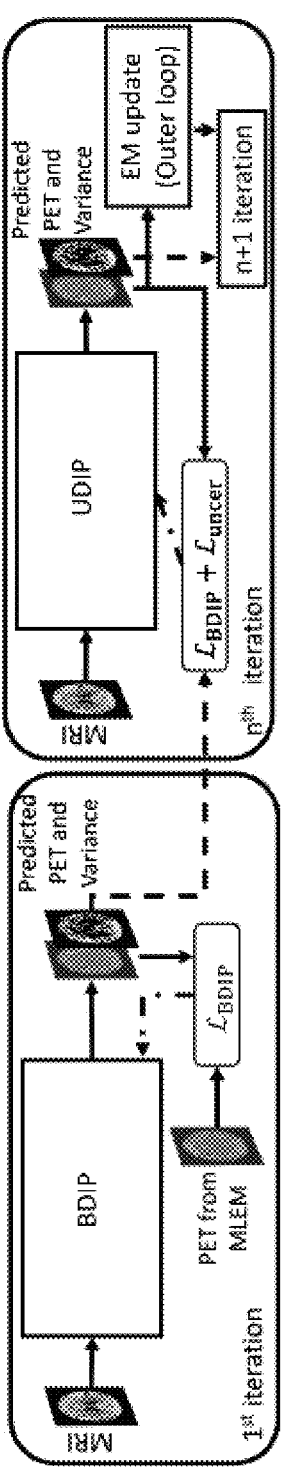
FIG. 2 depicts an exemplary high level block diagram of the system for reconstructing images using uncertainty loss, in accordance with an embodiment of the present disclosure.

FIG. 2, with reference to FIG. 1, depicts an exemplary high level block diagram of the system 100 for reconstructing images using uncertainty loss, in accordance with an embodiment of the present disclosure.

FIG. 3, with reference to FIGS. 1 through 3, depicts an exemplary flow chart illustrating a method for reconstructing images using uncertainty loss, using the systems of FIG. 1-2, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the block diagram of the system 100 depicted in FIG. 2, and the flow diagram as depicted in FIG. 3.

In an embodiment, at step 202 of the method of the present disclosure, the one or more hardware processors 104 receive one or more measurements obtained from a pre-defined forward model associated with a physical process. For example, an x-ray computed tomography system captures a series of projections at different angles, recorded as sinogram. In magnetic resonance imaging the measurements are obtained in the form of k-space, in one example embodiment of the present disclosure.

In an embodiment, at step 204 of the method of the present disclosure, the one or more hardware processors 104 iteratively perform a plurality of steps until (i) a difference in an output of a specific image of (a) a current iteration and (b) a previous iteration reaches a threshold, or (ii) a pre-defined number of iterations.

In an embodiment, at step 204A of the method of the present disclosure, the one or more hardware processors 104 construct a first image based on the one or more measurements.

In an embodiment, at step 204B of the method of the present disclosure, the one or more hardware processors 104 train a neural network using the first image and a second image to obtain a third image and a fourth image. In an embodiment of the present disclosure, the first image serves as an input to a loss function for training the neural network. In an embodiment of the present disclosure, the second image serves as an input to a first layer of the neural network. In an embodiment of the present disclosure, the second image is different from the first image, wherein the second image serves as an input to the neural network. In the present disclosure, the first image is a positron emission tomography (PET) image, and the second image is a magnetic resonance imaging (MRI) image. It is to be understood by a person having ordinary skill in the art or person skilled in the art that the above PET and MRI images are considered as examples for better understanding of the embodiments described herein by the system and method and such examples shall not be construed as limiting the scope of the present disclosure. In other words, images other than PET and MRI images may also serve as inputs to the neural network and the entire system 100 for performing the method being described herein. In the present disclosure, since the PET and MRI images are considered, the third image is referred as a predicted PET image and the fourth image is referred as a variance image. The third image (e.g., the predicted PET image) and the fourth image (e.g., the variance image) are outputted/predicted at a final layer of the neural network being trained, in an embodiment of the present disclosure. In an embodiment, the final layer may be fully connected layer of the neural network. It is to be understood by a person having ordinary skill in the art or person skilled in the art that fully connected layer may not be the final layer in all instances or variants of a neural network architecture, and such examples as described above shall not be construed as limiting the scope of the present disclosure.

In an embodiment, at step 204C of the method of the present disclosure, the one or more hardware processors 104 perform a comparison of the first image with the third image to obtain a training loss (e.g., say mean square error (MSE) loss) comprising a reconstruction loss. This training loss is fed back to the neural network (e.g., Bayesian Deep Image Prior (DIP)) for training the neural network. The training loss comprises a reconstruction loss when the system 100 performs a first iteration (e.g., refer '1st iteration' depicted in FIG. 2). The training loss comprises a reconstruction loss and uncertainty loss when the system 100 performs subsequent iteration(s) (e.g., refer 'n+1 iteration' depicted in FIG. 2). More specifically, one or more weights of the neural network are trained using the training loss. In some instances, the generation or obtaining of the third image and the fourth image may involving a continuous process of training the BDIP for outputting. Such continuous process of training may be pre-configured or dynamically determined by several epochs to be run (e.g., say 100 epochs).

In an embodiment, at step 204D of the method of the present disclosure, the one or more hardware processors 104 estimate an uncertainty loss using the fourth image. In other words, using the variance image the uncertainty loss is estimated by the system 100.

In an embodiment, at step 204E of the method of the present disclosure, the one or more hardware processors 104 train the neural network, using the third image, the training loss comprising reconstruction loss, and the uncertainty loss to obtain the third image (e.g., the predicted PET image) and the fourth image (e.g., variance image). This can be referred in FIG. 2 represented as n+1 iteration, wherein the modified BDIP version by the system 100 is referred as uncertainty-weighted DIP (UDIP), in an embodiment of the present disclosure.

In an embodiment, at step 204F of the method of the present disclosure, the one or more hardware processors 104 perform a comparison of the fourth image of (i) the current iteration and (ii) a previous iteration. In other words, the variance image of the current iteration and the previous iteration are compared. For instance, say the variance image of $5^{th}$ iteration (previous iteration) and variance image of the $6^{th}$ iteration (current iteration) are compared to determine a difference in the variance images. The difference may be compared with a threshold, in one example embodiment. The threshold may be a pre-defined threshold (e.g., say 5% error or 5% difference as acceptable tolerance), in an example embodiment. The threshold may be also an empirically determined threshold. For instance, during the iterations being run, the system 100 may dynamically set the threshold based on the variance image output at various iterations observed. Say, in such scenarios, the system 100 may set the threshold as 3% acceptable threshold difference during the iterations being run and based on the output provided as variance image at each iteration.

In an embodiment of the present disclosure, a weighted loss function is computed based on the first image (e.g., the PET image), the third image (e.g., the predicted PET image) and the fourth image (e.g., the variance image). The above steps 202 through 204F are better understood by way of following description and examples: Model-based Image Reconstruction (MBIR) for PET:

Let U and V represent the co-registered pair of PET and MRI images, respectively, serving as input to the system 100, and each containing N voxels. Let operator $\mathcal{A}$ model a physical process (e.g., a PET forward process) to generate the measurements M (sinogram) from D detector pairs. The system 100 model $\mathcal{A}$ as strip integrals (e.g., refer "https://web.eecs.umich.eduhfessler/code/"). It is assumed by the system and method of the present disclosure that M follows a Poisson distribution (independent and identically distributed), the log-likelihood function for PET can be written as:

$$\log(P(M|U)) = \sum_{d=1}^{D} M_d \log W_d - W_d - \log M_d!, \text{ where } W = (\mathcal{A}U)$$

Unsupervised CNN-based Image Denoising:

Conventionally proposed DIP (e.g., refer "Ulyanov, D., Vedaldi, A., Lempitsky, V.: Deep image prior. In: IEEE Conf Comp Vis Patt Recog. pp. 9446{9454 (2018)"— also referred as Ulyanov et al.), used random noise, say E, as input to a deep convolution neural network (CNN), say $\Phi_\Theta(\cdot)$, parameterized by $\theta$. Typically, a mean squared error (MSE) between the predicted image and the noisy reference image is used as the loss function resulting in the optimization problem:

$$\text{argmin}_\Theta \frac{1}{N} \sum_i \|\Phi_\Theta(E)_i - Y_i\|_2^2,$$

where Y represents the noisy observation of the image, and $Y_i$ denotes the i-th voxel in Y, and N is the number of voxels in the image. As DIP tends to overfit to noisy reference data and requires strategies like early stopping as regularization, the conventional research work (e.g., refer "Tolle, M., Laves, M., Schlaefer, A.: A mean-field variational inference approach to deep image prior for inverse problems in medical imaging. In: Med Imag Deep Learning. pp. 745{760. PMLR (2021)"— also referred as Tolle et al.) proposed BDIP based on another conventional research work (e.g., refer "Kendall, A., Gal, Y.: What uncertainties do we need in Bayesian deep learning for computer vision? In: Adv Neural Info Proc Syst. p. 5574 (2017)"— also referred as Kendall et al.), for image denoising. BDIP models the per-voxel predictive uncertainty and consists of aleatoric and epistemic uncertainty. As mentioned earlier, BDIP showed that early stopping was not necessary the predicted images showed non-decreasing peak signal-to-noise ratio (PSNR) for the predicted image. In the present disclosure, the system and method described herein build on BDIP coupled with a data-fidelity term that is critical for severely ill-posed problems such as image reconstruction. Similarly, the system and method show how Bayesian uncertainty can be quantified within a Plug-and-Play (PnP) framework for improving image quality across iterations. Specifically, the system and method implement an improved PnP with uncertainty quantification which includes a modified BDIP with the uncertainty-weighted loss term. The modified BDIP is called uncertainty-weighted DIP (UDIP) as depicted in FIG. 2, which acts as the unsupervised CNN-based regularizer within the PnP framework for image reconstruction.

Let $\hat{Y}$ and $\hat{C}$ represent the two outputs of the neural network of FIG. 2 (e.g., say convolution neural network—CNN) representing the predicted image and the per-voxel variance, respectively. The final layer of the CNN is split to predict these two variables. Now, for computing the aleatoric uncertainty, the system and method consider the MSE loss with the variance term defined as $$\mathcal{L}_{BDIP} = \frac{1}{N} \sum_{i=1}^{N} \left( \frac{\|\hat{Y}_i - Y_i\|_2^2}{\hat{C}_i} + \log \hat{C}_i \right).$$

Here, $\hat{C}_i$ is used to compute the aleatoric uncertainty.

For numerical stability, (i) the system 100 predicts $\log \hat{C}_i$ and then exponentiates to retrieve the variance term and (ii) adds a small scalar to the denominator in equation above. The system and method employ variational dropout to quantify epistemic uncertainty as in conventional research work (e.g., refer (i) "Kendall et al., (ii) Sudarshan, V., Upadhyay, U., Egan, G., Chen, Z., Awate, S.: Towards lower-dose pet using physics-based uncertainty-aware multimodal learning with robustness to out-of-distribution data. Med Image Anal. 73, 102187 (2021)—also referred as Sudharshan et al.", and (iii) Tolle et al.). The CNN is trained with dropouts activated, i.e., randomly masked weight parameters. The final predicted image $\hat{Y}$ and the variance image $\hat{C}$ are then obtained by performing K forward passes also with dropouts. Thus, the predicted image is obtained as $$\hat{Y} = \frac{1}{K} \sum_{k=1}^{K} \hat{Y}^k.$$

Like Kendall et al., the aleatoric uncertainty is given as the mean variance image from the K samples, i.e., $$C_A = \frac{1}{K} \sum_{k=1}^{K} \hat{C}_k$$

and the epistemic uncertainty is computed as the variance of the set of predicted PET images (e.g., the third image), $$\{\hat{Y}^k\}_{k=1}^{K}, \text{ as } C_E = \frac{\sum_{k=1}^{K} \left(\hat{Y}^k - C_A\right)^2}{K}.$$

Uncertainty-weighted MSE loss for UDIP:

For the first iteration (n=1), the CNN is trained based on the loss $\mathcal{L}_{BDIP}$ (refer left side of FIG. 2). Subsequently, for the (n+1)-th iteration as depicted in right side/part of FIG. 2, the total uncertainty obtained in the n-th iteration, $$C_{total}^n = C_A^n + C_E^n,$$

is used to provide an additional penalty. Particularly, the system 100 and method define a global scalar threshold $\tau_U$ denoting the permissible uncertainty value. Next, the system 100 generates a binary risk map $R^n$ (for the n-th iteration) by thresholding the total uncertainty $C_{total}$ i.e., assigning 1 to voxels where $$C_{total_i}^n > \tau_U$$

and 0 otherwise. For the (n+1)-th iteration, the system 100 and method add an additional loss term (uncertainty loss), called $\mathcal{L}_{uncer}$ defined as:

$$\mathcal{L}_{uncer} = \frac{1}{N} \sum_{i=1}^{N} \|R_i^n(Y_i^n - \hat{Y}_i^n)\|_2^2.$$

Thus, the overall loss function becomes:

$$\mathcal{L}_{UDIP} = \frac{1}{N} \sum_{i=1}^{N} \left( \frac{\|\hat{Y}_i - Y_i\|_2^2}{\hat{C}_i} + \log \hat{C}_i \right) + \frac{\eta}{N} \sum_{i=1}^{N} \|R_i^n(Y_i^n - \hat{Y}_i^n)\|_2^2 \quad (1)$$

The first expression before (+) symbol in equation (1) (e.g., $$\frac{1}{N} \sum_{i=1}^{N} \left( \frac{\|\hat{Y}_i - Y_i\|_2^2}{\hat{C}_i} + \log \hat{C}_i \right)$$

is MSR with variance term included, and the second expression after (+) symbol (e.g., $$\frac{\eta}{N} \sum_{i=1}^{N} \|R_i^n(Y_i^n - \hat{Y}_i^n)\|_2^2$$

is Uncertainty-weighted term, where $\eta$ is a hyperparameter. The framework as implemented by the system and method of the present disclosure is summarized in FIG. 2, which is also referred herein as CNN trained with the loss $\mathcal{L}_{UDIP}$ as $\Phi_\ominus^{UDIP}(\cdot)$. PnP with UDIP prior for PET reconstruction:

Similar to conventional research works employing PnP framework (e.g., refer "Chan, S., Wang, X., Elgendy, O: Plug-and-play admm for image restoration: Fixed-point convergence and applications. IEEE Trans Comput Imag. 3(1), 84{98 (2016)"—also referred as Chan et al.), the system and method adopt the alternating direction method of multipliers (ADMM) optimization scheme (or algorithm as known in the art) to reconstruct the PET images, by combining the PET data-fidelity term and the UDIP prior mentioned above. The system and method obtain reconstructed PET image (e.g., also referred as the third image or predicted PET image or PET constructed image) as the solution to the optimization problem: $\mathrm{argmin}_U \log(P(M|U)) + \alpha \log(P(U|V))$, where a denotes the regularization constant and $\log(P(U|V))$ denotes the prior term conditioned on the MRI image V (e.g., refer to the second image serving as an input to the first layer of the neural network—this is referred as conditioning). To decouple the data-fidelity and the regularizer terms, the system and method employ variable splitting and obtain the following constrained optimization problem: $\mathrm{argmin}_U \log(P(M|U)) + \alpha \log(P(Z|V))$ such that U=Z. Using the ADMM scheme to solve the above said problem, results in the following update equations with the auxiliary variable Z and a penalty variable $\rho$ as:

$$U^{n+1} = \mathrm{argmin}_U \log(P(M|U)) - \frac{\rho}{2}\|U^n - Z^n + \Gamma^n\|_2^2 \quad (2)$$

$$Z^{n+1} = \Phi_\ominus^{UDIP_{n+1}}(U^{n+1} \mid V) \quad (3)$$

$$\Gamma^{n+1} = \Gamma^n + U^{n+1} - Z^{n+1} \quad (4)$$

Above equation (2) has a fixed-point update obtained by formulating a surrogate function involving a maximum-likelihood-based expectation maximization (MLEM) update and the solution to the quadratic term as shown in a conventional research work (e.g., refer "Gong, K., Catana, C., Qi, J., Li, Q.: Pet image reconstruction using deep image prior. IEEE Trans Med Imag. 38(7), 1655{1665 (2018)"—also referred as Gong et al.). Equation (3) is obtained by replacing the proximal map with the update from the denoiser $$\Phi_\ominus^{UDIP}(.),$$

which is trained with the loss $\mathcal{L}_{UDIP}$ for a fixed number of iterations.) Equation (4) is the update for the dual variable $\Gamma$.
Implementation Details:

The system 100 and method of the present disclosure used a U-net architecture (e.g., refer "Ronneberger, O., Fischer, P., Brox, T.: U-Net: Convolutional networks for biomedical image segmentation. In: MICCAI. p. 234 (2015)"—also referred as Ronneberger et al.) for the UDIP network with 4 cascaded layers of 2D convolutions, batch normalization, leaky ReLU activation function, and dropouts with a heuristically chosen probability of 0.2. Parameters $\rho$ and $\eta$ both were set to 1. Analysis on the effect of hyperparameters ($\rho$, $\eta$) has not been performed. The system 100 and method further used Adam optimizer with an initial learning rate of $10^{-4}$ followed by a weight decay.

For equation (3), the system 100 trained the network for 500 epochs, which was chosen heuristically. It is to be noted that the regularization constant is absorbed within the denoiser in equation (3).

Data and Experiments:

The system 100 evaluated the method described herein and the framework of FIG. 2 on three different datasets. First, the system 100 used the simulated PET and MRI phantom data used in research work (e.g., refer "Ehrhardt, M., Thielemans, K., Pizarro, L., Atkinson, D., Ourselin, S., Hutton, B., Brian, F., Arridge, S.: Joint reconstruction of PET-MRI by exploiting structural similarity. Inverse Problems 31, 015001 (2014)"—also referred as Ehrhardt et al.). Secondly, the system 100 simulates a PET image based on the brain segmentation map from the BrainWeb database as available and known in the art (e.g., for dataset refer "Cocosco, C., Kollokian, V., Kwan, R., Pike, G., Evans, A.: Brainweb: Online interface to a 3D MRI simulated brain database. In: NeuroImage. Citeseer (1997)"—also referred as Cocosco et al.), such that the uptake in the grey matter is px times (e.g., say 4x times) greater than that of the white matter. For both the datasets, the system 100 smoothened the PET image using a Gaussian filter (e.g., a filtering technique as known in the art) to represent smooth metabolic variations in the brain. Thirdly, the system 100 used the in vivo multimodal data from the Alzheimer's Database Neuroimaging Initiative (ADNI) across three classes: cognitively normal (ADNI-CN), mild cognitive impairment (ADNI-MCI), and Alzheimer's Dementia (ADNI-AD). The fluorodeoxyglucose (FDG)-PET image resolution was 2 mm and that of MRI was 1.5 mm isotropic and were aligned using rigid registration. The PET data was retrospectively obtained as in the case of BrainWeb data. The system 100 of the present disclosure compared method of FIG. 3 with other PET reconstruction methods: (i) MLEM with post-reconstruction smoothing, (ii) PLS prior, representing the quadratic PLS prior proposed in Ehrhardt et al. and penalized the location and orientation of the joint image gradients in PET and MRI, (iii) Asym-Bowsher prior, as in prior work (e.g., refer "Vunckx, K., Nuyts, J.: Heuristic modification of an anatomical Markov prior improves its performance. In: IEEE Nucl Sci Symp Med Imag Conf. pp. 3262{3266. IEEE (2010)"— also referred as Vunckx et al.), which employs a weighted Huber-loss where the weights were computed using the MRI image, (iv) joint dictionary prior (JD), where a joint dictionary of MRI and PET images were learnt based on sparsity constraints on the learned coefficients, and (v) ADMM-CDIP, which is the iterative PET reconstruction scheme used in another research work (e.g., refer "Cui, J., Gong, K., Guo, N., Wu, C., Meng, X., Kim, K., Zheng, K., Wu, Z., Fu, L., Xu, B., et al.: PET image denoising using unsupervised deep learning. Eur J Nucl Med Mol Imag. 46, 2780 (2019)"—also referred as Cui et al.) with a DIP-based CNN. The system 100 of the present disclosure used PSNR as the image-quality metric for quantitative comparison across methods.

Hyperparameter tuning. For the phantom data, the system 100 tuned the hyperparameters for all the methods to obtain maximum PSNR between the reconstructed and the true PET image. For the BrainWeb data, hyperparameters were tuned based on validation data. For the phantom and the BrainWeb data, $\tau_U$ was found to be $10^{-5}$ and $10^{-4}$, respectively. Hyperparameters for the in vivo data were retained from the experiments on BrainWeb data.

Figure 4:
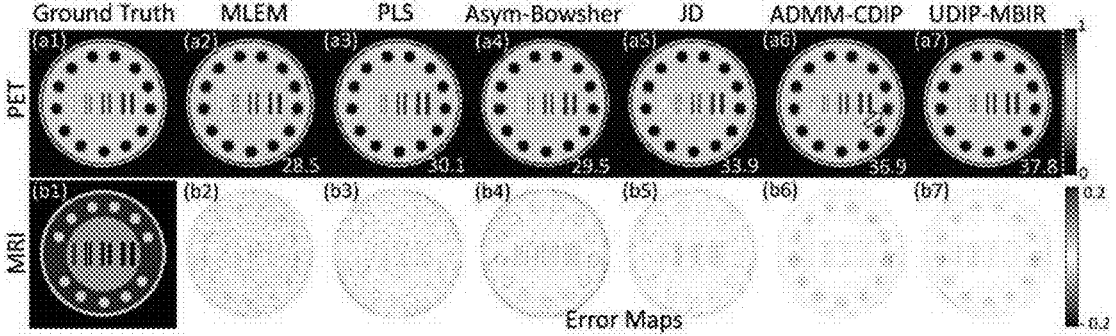
FIG. 4 depicts reconstructed images from phantom dataset, in accordance with an embodiment of the present disclosure.

Results on Simulated Data:

FIG. 4 shows the reconstructed images from all the methods and the corresponding error maps. More specifically, FIG. 4, with reference to FIGS. 1 through 3, depicts reconstructed images from phantom dataset, in accordance with an embodiment of the present disclosure. The MLEM method, which does not include any prior, retained a large amount of noise. The PLS and Asym-Bowsher (FIG. 4 (*a*3), (*a*4)) achieve a sharper PET image (red bars) leveraging the anatomical information from the MRI image. However, these methods suffer from artifacts (distorted central blue blob) arising from joint/multimodal priors. The JD method restores the regularity in structure for the colored bars (e.g., say red bars/grey bars) and the circular blobs, both. However, the separation between the closely placed colored bars (or red/grey bars) is quite blurred compared to the other methods. While the ADMM-CDIP removes the noise to a great extent, it shows behavior akin to PLS and Asym-Bowsher priors. The method of the present disclosure improved over the ADMM-CDIP method by restoring the circular blob (arrow) with greater resistance to cross-modality artifacts leveraging uncertainty information discussed in detail later. For both the simulated data, the method yielded quantitative improvement, in terms of PSNR, over other comparison methods as depicted in FIG. 4. More specifically, in FIGS. 4, Top (a1-a7) depict Ground truth and reconstructed PET images from all the methods. Bottom (b1-b7) depict MRI image and error maps with respect to (a1). The PSNR value is provided within each panel.

Figure 5:
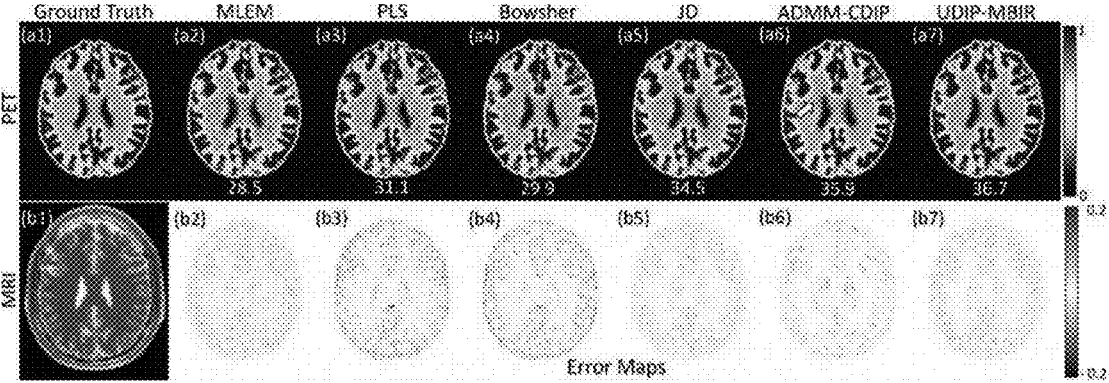
FIG. 5 shows reconstructed images from BrainWeb dataset, in accordance with an embodiment of the present disclosure.

FIG. 5 shows the results on the BrainWeb data. Similar to the phantom data, the PLS, Asym-Bowsher, and the ADMM-CDIP restore the structure and contrast with the help of MRI information while showing some cross-modal information (arrow in FIG. 5 (*a*6)). More specifically, FIG. 5, with reference to FIGS. 1 through 4, shows reconstructed images from BrainWeb dataset, in accordance with an embodiment of the present disclosure. The UDIP-MBIR method of FIG. 3 and architecture of FIG. 2 of the present disclosure restores the regularity as found in the ground truth PET image while removing the noise to a large extent. The error maps show that both ADMM-CDIP and UDIP-MBIR lower residual values with our method showing minimal structure. In FIG. 5, Top representations depict Ground truth PET and reconstructed PET images from all the methods, and Bottom representations depict MRI image and error maps with respect to (a1). The PSNR value is provided within each panel.

Figure 6:
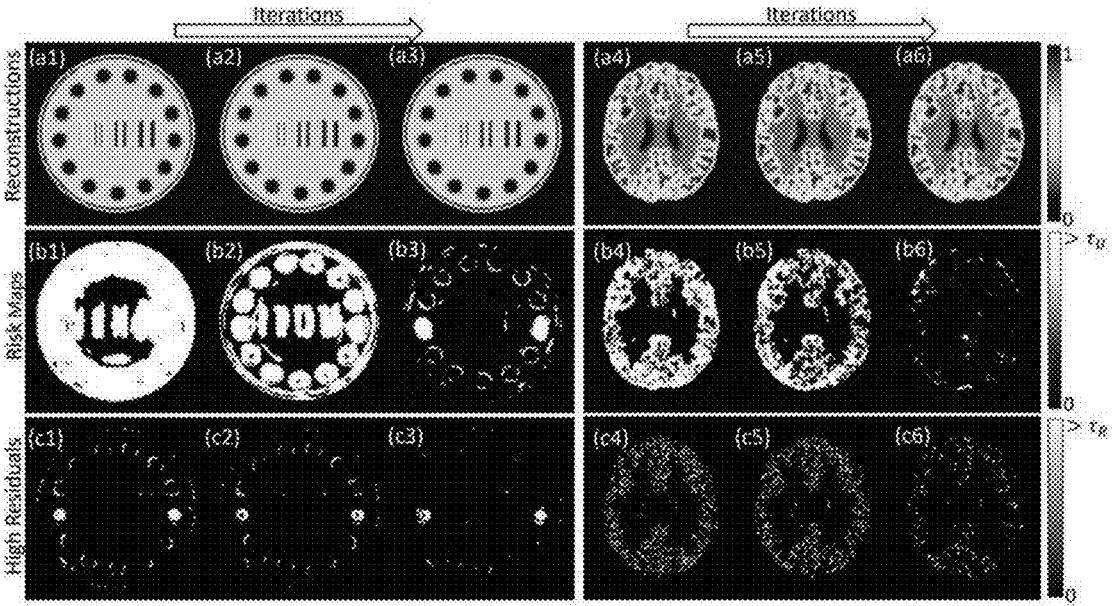
FIG. 6 depicts evolving positron emission tomography (PET) images and warning maps across iterations, in accordance with an embodiment of the present disclosure.

Evolution of Uncertainty Maps Across Iterations:

FIG. 6 shows the reconstructed PET images, associated risk maps, and the error maps for both the simulated datasets. More specifically, FIG. 6, with reference to FIGS. 1 through 5, depicts evolving positron emission tomography (PET) images and warning maps across iterations, in accordance with an embodiment of the present disclosure. In FIG. 6, it is shown that the risk maps are obtained for each iteration by applying a global threshold, determined based on validation data. The UDIP-MBIR framework depicted in FIG. 2 shows reducing risk across iterations, e.g., for phantom data, the risk associated with the color bars (e.g., red bars/grey bars) diminishes by the third iteration (FIG. 6 (*b*1)-(*b*3)). Similar observation can be made for the ventricles in the BrainWeb data (FIG. 6 (*b*4)-(*b*6)). The high residual maps (FIG. 6 row c) represent the absolute values of the error maps with values greater than 10%. Importantly, high residual regions do coincide with regions with high uncertainty. In FIG. 6, the risk maps (row 2) are obtained by thresholding using $\tau_U$ and high residual maps (row 3) using $\tau_R$. For the phantom: $\tau_U=10^{-5}$ and $\tau_U=10\%$ and for the BrainWeb dataset $\tau_U=10^{-4}$ and $\tau_U=5\%$. The risk maps provided additional penalties during subsequent iterations. Areas with high residual correspond to areas with high uncertainty values demonstrated the usefulness of the risk maps in the absence of ground truth.

Figure 7:
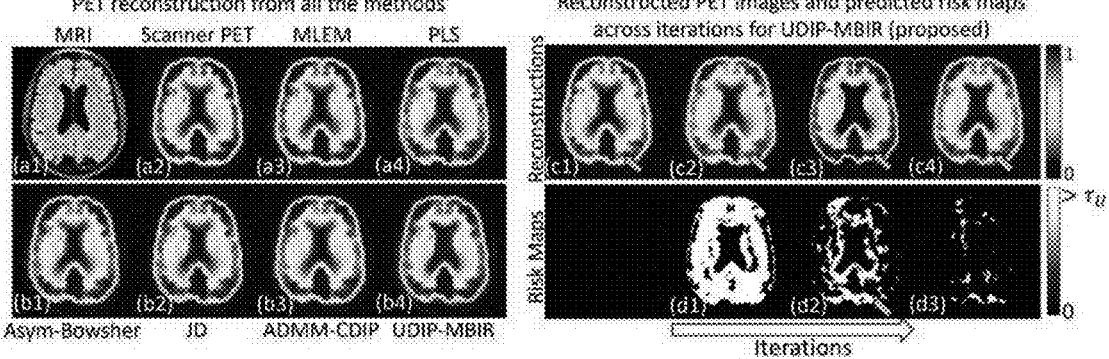
FIG. 7 shows reconstructed PET images for data obtained retrospectively from a representative subject with Alzheimer's Dementia (AD) condition, in accordance with an embodiment of the present disclosure.

Results on In Vivo Data:

FIG. 7, with reference to FIGS. 1 through 6, shows reconstructed PET images for data obtained retrospectively from a representative subject with Alzheimer's Dementia (AD) condition, in accordance with an embodiment of the present disclosure. The Supplementary material contained results for classes ADNI-MCI and ADNI-CN. As in the simulated case, the PLS and Asym-Bowsher methods (FIG. 6 (*a*4) and (*b*1)) introduce a lot of MRI-like features. On the other hand, both the ADMM-CDIP (b3) and the UDIP-MBIR (b4) methods of the present disclosure produced images that retain similar activity distribution as the scanner-provided image. In addition, the method of the present disclosure provides additional risk maps shown in the right panel of the FIG. 7. While in the first iteration (c2), the overall scale of the image was slightly reduced compared to the scanner image (c1), in the second iteration (c3), there was an overestimation indicated by the green arrow, and these in turn are in agreement with the high intensities in the risk map. The final image shows activity distribution similar to the scanner-provided image along with improvements in finer details aided by the MRI image (cortical foldings). The risk maps inform about the potential risk involved in clinically interpreting the reconstructed images and can act as a proxy for the error maps in the absence of ground truth. More specifically, in FIG. 6, the left side depicts qualitative comparison of reconstructed images from noisy PET data obtained retrospectively using the scanner-provided PET image (a2), and right side depicts the reconstructed images (row c) and associated risk maps (row d) from the UDIP-MBIR (which is the method of the present disclosure).

Based on the above FIGS. and embodiments described herein, the system and method of the present disclosure quantify uncertainty within the PnP framework for model-based iterative image reconstruction. Furthermore, the system and method leveraged the uncertainty information to penalize regions with higher uncertainty resulting in improved image quality in the subsequent iterations. Results on simulated and in vivo data both showed that as the iterations progress, the system and method observed (i) a reduction in number of voxels prone to risk and (ii) an increase in PSNR. In the absence of ground truth, the thresholded uncertainty maps served as a proxy for error maps and can potentially enable the clinician to make an informed diagnosis or prescribe a rescan.

Figure 8:
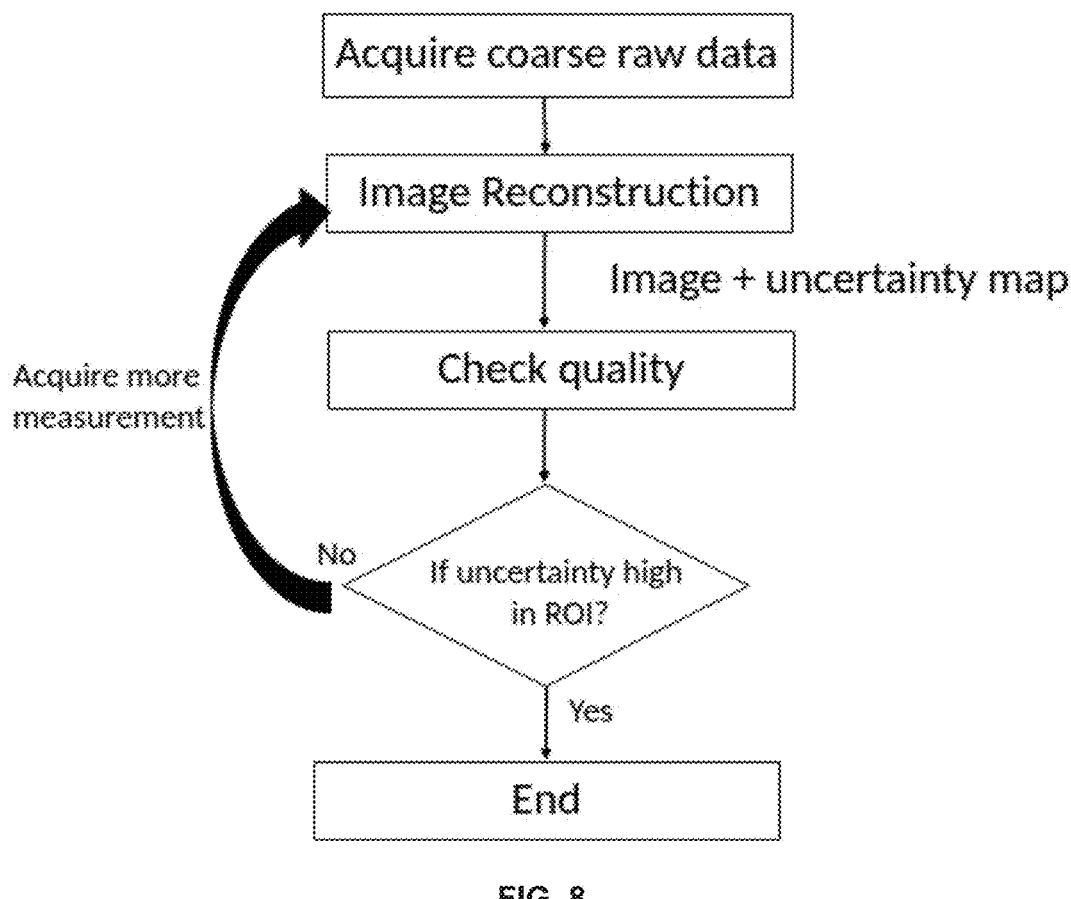
FIG. 8 depicts a flow chart illustrating a method of refinement of reconstructed image based on one or more inputs using risk maps obtained from current reconstruction output (e.g., feedback from subject matter expert based on observation on region of interest in the reconstructed image output), in accordance with an embodiment of the present disclosure.

Once the variance image output is derived by the system 100 (based on the difference between current and previous iteration or epochs run for a specific number of iterations), one or more inputs may be obtained from one or more users (e.g., domain experts such as medical professional, a physician, and the like). These inputs received from the domain experts may serve as feedback or a request for further refinement of images for better reconstruction. In other words, the domain experts may provide a marker around a region of interest (ROI) in the variance image suggesting for further refinement. In such scenarios, the system 100 may repeat the steps of 202 and 204 iteratively until the predicted outcome desired by the domain expert is obtained. In other words, the system 100 may receive revised set of measurements (e.g., another set of measurements pertaining to the pre-defined forward model associated with the physical process and iteratively perform the steps 204A through 204F until the desired variance image is derived as an output. The above description of receiving inputs from domain experts/users and performing the steps of 202 through 204F is depicted in FIG. 8. More specifically, FIG. 8, with reference to FIGS. 1 through 7, depicts a flow chart illustrating a method of refinement of reconstructed image based on one or more inputs using risk maps obtained from current reconstruction output (e.g., feedback from subject matter expert based on observation on region of interest in the reconstructed image output), in accordance with an embodiment of the present disclosure. This may also be referred as optimal image quality for diagnosis and post processing. For example, say domain expert such as a radiologist wants the uncertain region to be more clear/certain, and the system provides the 'policy' along with radiologist in loop decides what dose/modality/tracers/etc. are required from best imaging the region of interest. This may also be referred as "reinforcement learning". Therefore, the system 100 enables incremental quality enhancement based on uncertain region estimation and feedback from radiologist. Thus, the goal and/or the objective of the system 100 and the method of the present disclosure is to produce a diagnostic quality image using as little measurements as possible. However, with lesser measurements the uncertainty also increases. The method of the present disclosure may have a human in the loop model implemented and depending on the feedback (by observing the current reconstruction output uncertainty maps), captures additional measurements to enhance the image in the region of interest wherein a set of measurements different (or similar) to the earlier measurements may be obtained. In other words, the measurements are taken in an incremental manner, and wherein feedback or inputs from a domain expert may include, such as, but not limited to, radiologist checks image quality, checks uncertainty maps, marks the region of interest/region of enhancement required. In response these inputs, the system 100 at each stage of the pipeline, computes uncertainty maps and these uncertainty maps are used to enhance the output of the subsequent stages.

As mentioned in the present disclosure, the system and method implement an iterative model-based framework involving Bayesian DIP that models per-voxel predictive uncertainty via both aleatoric and epistemic uncertainty (also referred as uncertainty loss). The uncertainty information/loss along with training loss are leveraged across iterations to further improve the image quality using an additional loss term penalizing the regions with high uncertainty. Results on in silico and in vivo data shows that the method of the present disclosure yielded improved reconstruction compared to MBIR methods with conventional priors and typical DIP without uncertainty. Additionally, visualizing the uncertainty maps across iterations provides insights on improving image quality and can aid towards improved risk management in clinics.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving, via one or more hardware processors, one or more measurements obtained from a pre-defined forward model associated with a physical process; and
constructing, via the one or more hardware processors, a first image based on the one or more measurements;
training, a neural network via the one or more hardware processors, using the first image and a second image to obtain a third image and a fourth image, wherein the first image serves as an input to a loss function for training the neural network, wherein the second image serves as an input to the neural network, wherein the third image is predicted image or reconstructed image and the fourth image is variance image;
iteratively performing:
performing a comparison of the first image with the third image to obtain a training loss comprising a reconstruction loss, wherein the training loss is fed back to the neural network for training the neural network, wherein the training loss comprises the reconstruction loss when performing a first iteration and the training loss comprises the reconstruction loss and an uncertainty loss when performing subsequent iteration, wherein the training is pre-configured or dynamically determined, wherein the third image and the fourth image are outputted/predicted at a final layer of the neural network being trained;
estimating the uncertainty loss using the fourth image;
training the neural network via the one or more hardware processors, using the third image and the fourth image of a previous iteration, the training loss comprising the reconstruction loss, and the uncertainty loss to obtain the third image and the fourth image of the current iteration; and
performing a comparison of the fourth image of (i) the current iteration and (ii) the previous iteration,
until (i) a difference in an output of the fourth image of (a) the current iteration
and (b) the previous iteration reaches a threshold, or (ii) a pre-defined number of iterations.

2. The processor implemented method of claim 1, wherein the first image is a positron emission tomography (PET) image, wherein the PET image is a noisy image.

3. The processor implemented method of claim 1, wherein the second image is a magnetic resonance imaging (MRI) image.

4. The processor implemented method of claim 1, further comprising training one or more weights of the neural network using the training loss.

5. The processor implemented method of claim 1, wherein a weighted loss function is computed based on the first image, the third image and the fourth image.

6. The processor implemented method of claim 1, wherein the third image and the fourth image are obtained by splitting a final layer of the neural network.

7. A system, comprising:
a memory storing instructions;
one or more communication interfaces; and
one or more hardware processors coupled to the memory via the one or more communication interfaces, wherein the one or more hardware processors are configured by the instructions to:

receive one or more measurements obtained from a predefined forward model associated with a physical process; and constructing a first image based on the one or more measurements;

training a neural network using the first image and a second image to obtain a third image and a fourth image, wherein the first image serves as an input to a loss function for training the neural network, wherein the second image serves as an input to the neural network, wherein the third image is predicted image or reconstructed image and the fourth image is variance image;

iteratively perform:

performing a comparison of the first image with the third image to obtain a training loss comprising a reconstruction loss, wherein the training loss is fed back to the neural network for training the neural network, wherein the training loss comprises the reconstruction loss when performing a first iteration and the training loss comprises the reconstruction loss and an uncertainty loss when performing subsequent iteration, wherein the training is pre-configured or dynamically determined, wherein the third image and the fourth image are outputted/predicted at a final layer of the neural network being trained;

estimating the uncertainty loss using the fourth image;

training the neural network via the one or more hardware processors, using the third image and the fourth image of a previous iteration, the training loss comprising the reconstruction loss, and the uncertainty loss to obtain the third image and the fourth image of the current iteration; and performing a comparison of the fourth image of (i) the current iteration and (ii) the previous iteration, until (i) a difference in an output of the fourth image of (a) the current iteration and (b) the previous iteration reaches a threshold, or (ii) a pre-defined number of iterations.

8. The system of claim 7, wherein the first image is a positron emission tomography (PET) image, wherein the PET image is a noisy image.

9. The system of claim 7, wherein the second image is a magnetic resonance imaging (MRI) image.

10. The system of claim 7, wherein the one or more hardware processors are further configured by the instructions to train one or more weights of the neural network using the training loss.

11. The system of claim 7, wherein a weighted loss function is computed based on the first image, the third image and the fourth image.

12. The system of claim 7, wherein the third image and the fourth image are obtained by splitting a final layer of the neural network.

13. One or more non-transitory machine-readable information storage mediums comprising one or more instructions which when executed by one or more hardware processors cause:

receiving one or more measurements obtained from a pre-defined forward model associated with a physical process; and constructing a first image based on the one or more measurements;

training, a neural network, using the first image and a second image to obtain a third image and a fourth image, wherein the first image serves as an input to a loss function for training the neural network, wherein the second image serves as an input to the neural network, wherein the third image is predicted image or reconstructed image and the fourth image is variance image;

iteratively performing:

performing a comparison of the first image with the third image to obtain a training loss comprising a reconstruction loss, wherein the training loss is fed back to the neural network for training the neural network, wherein the training loss comprises the reconstruction loss when performing a first iteration and the training loss comprises the reconstruction loss and an uncertainty loss when performing subsequent iteration, wherein the training is pre-configured or dynamically determined, wherein the third image and the fourth image are outputted/predicted at a final layer of the neural network being trained;

estimating the uncertainty loss using the fourth image;

training the neural network, using the third image and fourth image of a previous iteration, the training loss comprising the reconstruction loss, and the uncertainty loss to obtain the third image and the fourth image of the current iteration; and performing a comparison of the fourth image of (i) the current iteration and (ii) the previous iteration, until (i) a difference in an output of the fourth image of (a) the current iteration and (b) the previous iteration reaches a threshold, or (ii) a pre-defined number of iterations.

14. The one or more non-transitory machine-readable information storage mediums of claim 13, wherein the first image is a positron emission tomography (PET) image, wherein the PET image is a noisy image.

15. The one or more non-transitory machine-readable information storage mediums of claim 13, wherein the second image is a magnetic resonance imaging (MRI) image.

16. The one or more non-transitory machine-readable information storage mediums of claim 13, wherein the one or more instructions which when executed by the one or more hardware processors further cause training one or more weights of the neural network using the training loss.

17. The one or more non-transitory machine-readable information storage mediums of claim 13, wherein a weighted loss function is computed based on the first image, the third image and the fourth image.

18. The one or more non-transitory machine-readable information storage mediums of claim 13, wherein the third image and the fourth image are obtained by splitting a final layer of the neural network.

* * * * *